United States Patent
Hasegawa et al.

(10) Patent No.: US 7,821,236 B2
(45) Date of Patent: Oct. 26, 2010

(54) CONTROL CIRCUIT FOR DETECTING A REVERSE CURRENT IN A DC-DC CONVERTER

(75) Inventors: Morihito Hasegawa, Kasugai (JP); Takashi Matsumoto, Kasugai (JP); Ryuta Nagai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 282 days.

(21) Appl. No.: 11/937,822

(22) Filed: Nov. 9, 2007

(65) Prior Publication Data
US 2008/0136383 A1  Jun. 12, 2008

(30) Foreign Application Priority Data
Nov. 10, 2006  (JP) .............................. 2006-305451

(51) Int. Cl.
G05F 1/10   (2006.01)
G05F 1/656  (2006.01)

(52) U.S. Cl. ...................... 323/222; 323/282; 323/284; 323/286

(58) Field of Classification Search ................. 323/222, 323/282, 284, 286
See application file for complete search history.

(56) References Cited

U.S. PATENT DOCUMENTS 6,541,947 B1 * 4/2003 Dittmer et al. .............. 323/284
7,307,406 B2 * 12/2007 Shirai et al. ................. 323/285
7,420,356 B2 * 9/2008 Hojo ........................... 323/276
7,548,050 B2 * 6/2009 Shirai et al. ................. 323/285
2007/0257651 A1 * 11/2007 Wrathall ...................... 323/284
2009/0033299 A1 * 2/2009 Ishino ......................... 323/282
2009/0201000 A1 * 8/2009 Kojima et al. ............... 323/282

FOREIGN PATENT DOCUMENTS

JP    06-303766    10/1994
JP    2006-305451  11/2006

* cited by examiner

Primary Examiner—Bao Q Vu
(74) Attorney, Agent, or Firm—Fujitsu Patent Center

(57) ABSTRACT

A DC-DC converter reducing reverse current and maintaining high conversion efficiency under a light load. The DC-DC converter perform pulse width modulation (PWM) or pulse frequency modulation (PFM) and includes a drive control circuit generating a first drive signal and a second drive signal activating and inactivating a first transistor and a second transistor in a complementary manner. A reversed flow detection circuit detects current flowing to the second transistor and generates a detection signal controlling activation and inactivation of the second transistor. A detection signal invalidation circuit, coupled to the reversed flow detection circuit and the drive control circuit, receiving an operation switch signal and invalidating the detection signal in response to the operation switch signal during at least a certain period of the PWM.

22 Claims, 12 Drawing Sheets

CONTROL CIRCUIT FOR DETECTING A REVERSE CURRENT IN A DC-DC CONVERTER

CROSS-REFERENCE TO RELATED APPLICATIONS

This application is based upon and claims the benefit of priority from the prior Japanese Patent Application No. 2006-305451, filed on Nov. 10, 2006, the entire contents of which are incorporated herein by reference.

BACKGROUND

1. Field

It is related to a control circuit for a DC-DC converter.

2. Description of the Related Art

Recent electronic devices such as a personal computer use DC-DC converters as power supplies. In such a DC-DC converter, high conversion efficiency is required for a wide load range extending from a heavy load in which a large amount of power is supplied to a light load in which a small amount of power is supplied.

A battery is installed in a portable electronic device as a drive power supply. The output voltage of the battery is decreased by device usage and discharging. Thus, a direct current voltage conversion circuit (DC-DC converter) for converting the voltage of the battery to a constant voltage is arranged in the electronic device. A synchronous rectification type DC-DC converter, which is compact and has satisfactory conversion efficiency, is used for a portable electronic device. A typical synchronous rectification type DC-DC converter performs pulse width modulation (PWM) and alternately activates and inactivates a main switching transistor and a synchronous transistor. Specifically, energy is supplied from an input side to an output side of the DC-DC converter when the main switching transistor is activated, and energy accumulated in a choke coil is discharged when the main switching transistor is inactivated. The synchronous transistor is inactivated in synchronization with the timing the energy accumulated in the choke coil is discharged to the load. The DC-DC converter controls the pulse width of a pulse signal that drives the main switching transistor in accordance with the output voltage or output current to keep the output voltage substantially constant.

In the above-described DC-DC converter, high conversion efficiency is required for a wide load range extending from a heavy load in which a large amount of power is supplied to a light load in which a small amount of power is supplied. However, a relatively large power loss occurs in the DC-DC converter compared to the power consumption at the load when driving the main switching transistor under a light load. It is generally known that this significantly lowers the conversion efficiency.

To prevent the lowering of the conversion efficiency under a light load, Japanese Laid-Open Patent Publication No. 6-303766 proposes a DC-DC converter that switches from pulse width modulation (PWM) to pulse frequency modulation (PFM) when the load is light. The DC-DC converter performs PWM under normal operations, which include operations under a heavy load, and PFM when the load is light. The PFM includes true PFM, which controls the switching frequency of the drive signal provided to the main switching transistor in accordance with the output voltage of the DC-DC converter, and pseudo-PFM, which keeps the switching frequency constant and reduces switching operations in accordance with the output voltage of the DC-DC converter.

In both true PFM and pseudo-PFM, the switching frequency under a light load becomes lower than that during PWM. This reduces the power loss of the DC-DC converter. Accordingly, this suppresses the lowering of the conversion efficiency when the load is light.

It is generally known that a DC-DC converter that switches between PWM and PFM holds a constant output voltage while maintaining high conversion efficiency in a wide load range. However, if the main switching transistor is inactivated under a light load, reverse current may flow from the load towards ground via the synchronous transistor. This results in the loss of the energy accumulated in the choke coil and lowers the conversion efficiency when the load is light.

SUMMARY

It is an aspect of the embodiments discussed herein to provide a DC-DC converter performing pulse width modulation or pulse frequency modulation and outputting an output voltage via a choke coil, the DC-DC converter including a first transistor receiving an input voltage, a second transistor coupled to the first transistor, the choke coil being coupled to a node between the first and second transistors, a drive control circuit, coupled to the first and second transistors, generating a first drive signal and a second drive signal activating and inactivating the first transistor and the second transistor in a complementary manner, a reversed flow detection circuit detecting current flowing to the second transistor and generating a detection signal controlling activation and inactivation of the second transistor, and a detection signal invalidation circuit, coupled to the reversed flow detection circuit and the drive control circuit, invalidating the detection signal in response to an operation switch signal during the pulse width modulation.

Other aspects and advantages will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
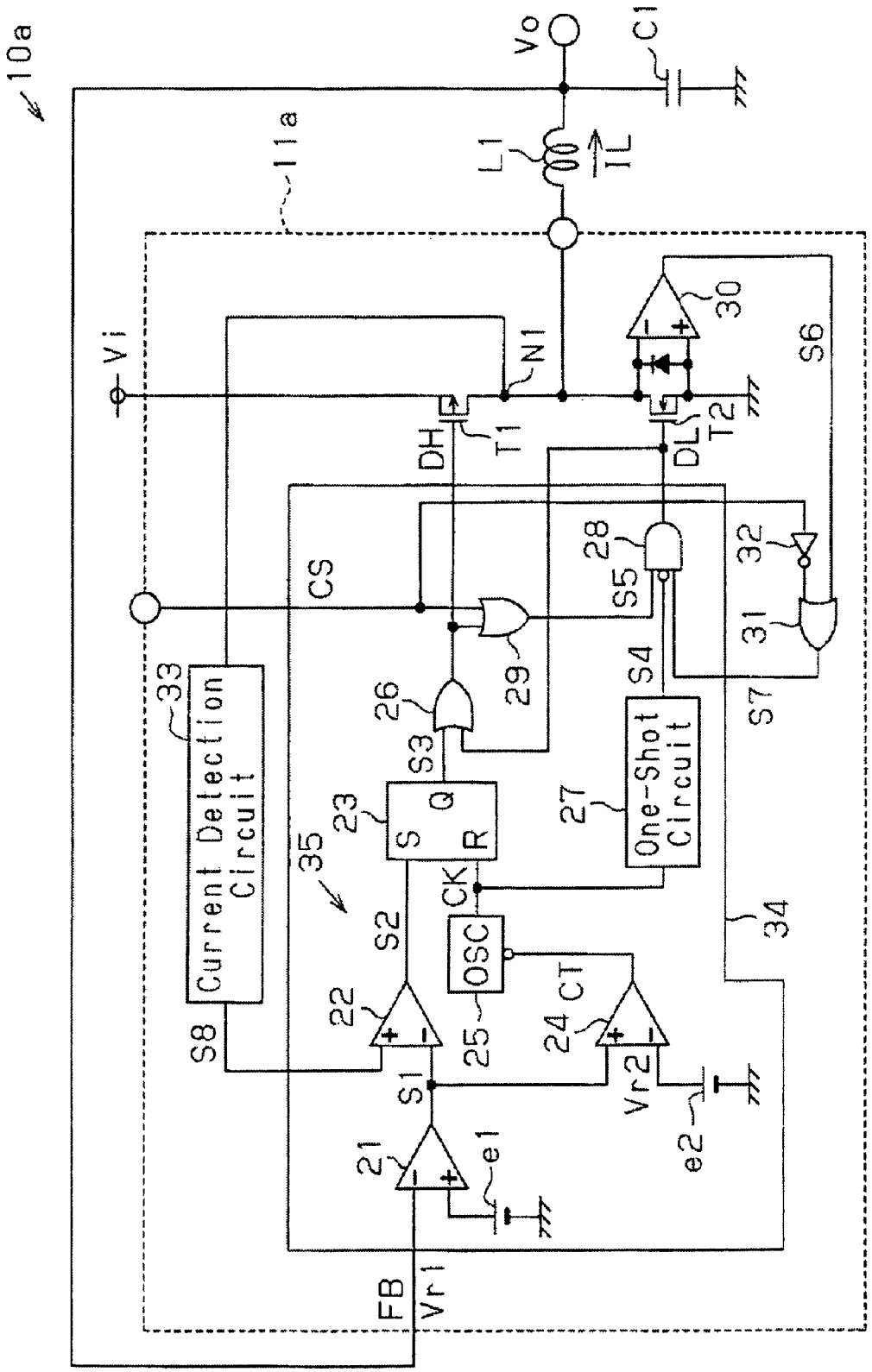
FIG. 1 is a schematic circuit diagram of a DC-DC converter according to a preferred embodiment.

In the drawings, like numerals are used for like elements throughout.

A preferred embodiment will now be described with reference to FIGS. 1 to 9.

Referring to FIG. 1, a DC-DC converter 10a lowers an input voltage Vi to an output voltage Vo having the desired voltage value by performing PWM or PFM.

The DC-DC converter 10a is a current control type DC-DC converter and includes a control circuit 11a, a choke coil L1, and a smoothing capacitor C1. The control circuit 11a includes a first MOS transistor T1, a second MOS transistor T2, and a drive control circuit 34. The DC-DC converter 10a stabilizes the output voltage Vo through a current mode operation. In the current mode operation, the DC-DC converter 10a amplifies the difference between a reference voltage and the output voltage Vo with an error amplifier. Then, the DC-DC converter 10a uses a current comparator to compare the amplified voltage of the error amplifier with a voltage proportional to the current flowing to the choke coil L1. Thus, the DC-DC converter 10a controls the peak current of the choke coil L1 and stabilizes the output voltage Vo.

The control circuit 11a has an output terminal coupled to a first terminal of the choke coil L1. The choke coil L1 has a second terminal coupled to a semiconductor integrated circuit device (not shown) serving as a load. The control circuit 11a supplies the output voltage Vo to the load via the choke coil L1. The smoothing capacitor C1 for smoothing the output voltage Vo is coupled to the second terminal of the choke coil L1. The output voltage Vo is supplied to the control circuit 11a as a feedback signal FB.

The control circuit 11a includes an error amplifier 21 having an inversion input terminal provided with a feedback signal FB. The error amplifier 21 also has a non-inversion input terminal supplied with a first reference voltage Vr1 from a first reference power supply e1. The error amplifier 21 provides a current comparator 22 with an error signal S1, which indicates a voltage corresponding to the difference between the voltage of the feedback signal FB, or the output voltage Vo, and the first reference voltage Vr1.

The error signal S1 from the error amplifier 21 and an output signal S8 from a current detection circuit 33 are provided to the current comparator 22. The output signal S8 indicates a voltage proportional to the current IL flowing to the choke coil L1. The current comparator 22 compares the signals S1 and S8 to provide a flip-flop (FF) circuit 23 with a signal S2 having an H level or L level in correspondence with the comparison result.

The error signal S1 from the error amplifier 21 is also provided to an inversion input terminal of a first comparator 24 serving as an operation stop circuit. A second reference voltage Vr2 from a second reference power supply e2 is supplied to a non-inversion input terminal of the first comparator 24. The first comparator 24 compares the error signal S1 and the second reference voltage Vr2 to provide an oscillator (OSC) 25 with an operation control signal CT having an H level or L level in correspondence with the comparison result. The first comparator 24 generates the operation control signal CT with an H level when the voltage of the error signal S1 is lower than the second reference voltage Vr2. Further, the first comparator 24 generates the operation control signal CT having an L level when the voltage of the error signal S1 is higher than the second reference voltage Vr2. More specifically, the voltage of the error signal S1 is always higher than the second reference voltage Vr2 under a heavy load. Thus, the first comparator 24 constantly generates the operation control signal CT at an L level. On the other hand, the voltage of the error signal S1 may be higher or lower than the second reference voltage Vr2 under a light load. Thus, the first comparator 24 generates the operation control signal CT with an L level or H level in accordance with the voltage of the error signal S1 (output voltage Vo). The second reference voltage Vr2 is set in accordance with the output voltage Vo, which varies depending on the load. That is, the second reference voltage Vr2 is set in accordance with the error signal S1 provided from the error amplifier 21.

The oscillator 25 oscillates in response to an operation control signal CT having an L level to provide a reset terminal R of the FF circuit 23 with a clock signal CK having a predetermined cycle. The oscillator 25 stops oscillation in response to an operation control signal CT having an H level. Accordingly, under a heavy load, the control circuit 11a performs PWM when the oscillator 25 constantly oscillates in response to an operation control signal CT having an L level. Under a light load, the control circuit 11a performs pseudo-PFM when the oscillator 25 intermittently oscillates in response to the operation control signal CT having an H level.

The FF circuit 23 is a reset-set (RS) flip-flop circuit. The signal S2 from the current comparator 22 is provided to the set terminal S of the FF circuit 23. The clock signal CK generated by the oscillator 25 is provided to the reset terminal R of the FF circuit 23. When the signal S2 input to the set terminal S has an H level, the FF circuit 23 "sets" a pulse signal S3, that is, provides a pulse signal S3 having an H level to a first driver circuit 26 from an output terminal Q. Furthermore, when the clock signal CK input to the reset terminal R has an H level, the FF circuit 23 "resets" the pulse signal S3, that is, provides a pulse signal S3 having an L level to the first driver circuit 26 from the output terminal Q. The current comparator 22, the FF circuit 23, the first comparator 24, and the oscillator 25 form a pulse signal generation circuit 35.

The signal S3 from the FF circuit 23 and an output signal (second drive signal DL) of a second driver circuit 28 are provided to the first driver circuit 26. The first driver circuit 26 performs a logic OR operation with the signal S3 from the FF circuit 23 and the output signal from the second driver circuit 28 to generate a first drive signal DH indicating the operation result.

The first drive signal DH is provided to a first MOS transistor T1, which is used for output purposes. The first MOS transistor T1, which is a P-channel MOS transistor in the preferred embodiment, includes a gate (control terminal) for receiving the first drive signal DH, a source for receiving the input voltage Vi, and a drain coupled to the choke coil L1. The first MOS transistor T1 is activated in response to a first drive signal DH having an L level and inactivated in response to a first drive signal DH having an H level.

The clock signal CK of the oscillator 25 is also provided to a one-shot circuit 27. The one-shot circuit 27 provides a pulse signal S4 (tunneling prevention pulse) having a predetermined pulse width to the second driver circuit 28 in response to the rising edge of the clock signal CK. The pulse width of the pulse signal S4 is set in accordance with a signal delay time in the control circuit 11a.

Figure 3:
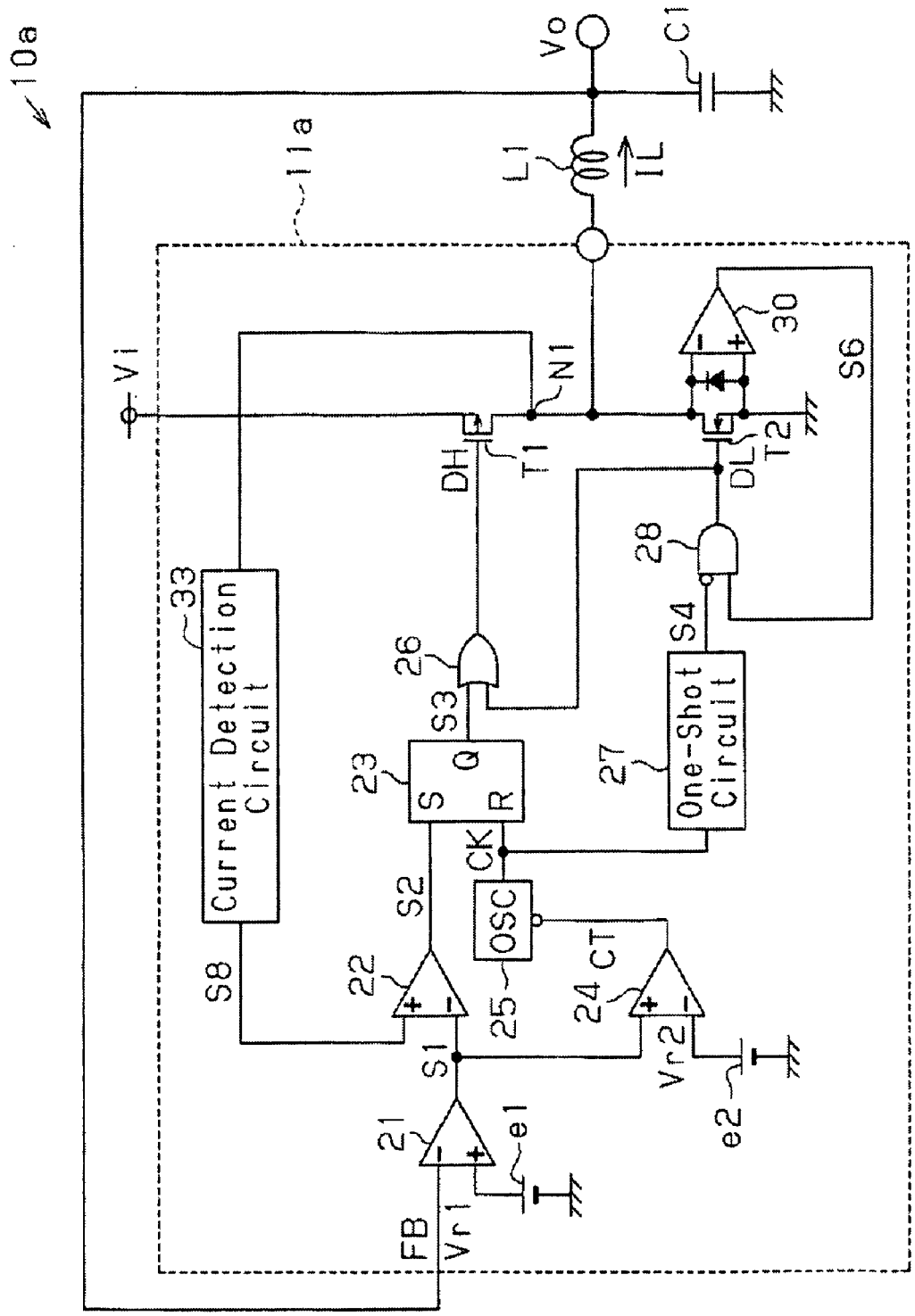
FIG. 3 is an equivalent circuit diagram of the DC-DC converter of FIG. 1 during PFM.
Figure 4:
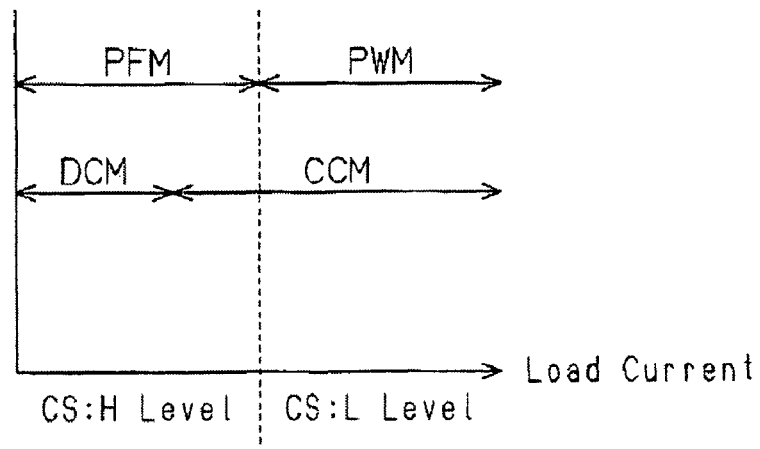
FIG. 4 is a diagram showing a switching point of PWM and PFM.
Figure 5:
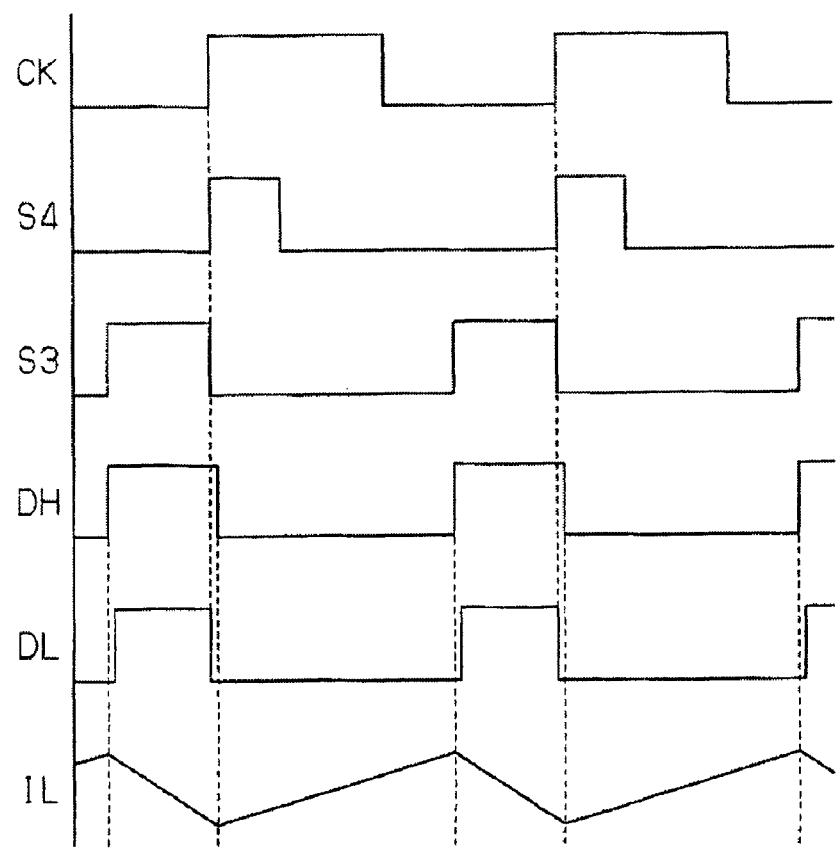
FIG. 5 is a waveform chart illustrating the operation of the DC-DC converter shown in FIG. 1 during PWM.

The first drive signal DH of the first driver circuit 26 is also provided to a first OR circuit 29 serving as a drive signal invalidation circuit. An operation switch signal CS from an external circuit (not shown) is also provided to the first OR circuit 29. The first OR circuit 29 performs a logic OR operation OR with the first drive signal DH and the operation switch signal CS to provide a signal S5 indicating the operation result to the second driver circuit 28. The operation switch signal CS is a signal for virtually modifying the control circuit 11a to the circuit of FIG. 2 or circuit of FIG. 3. The operation switch signal CS is set to an L level when the control circuit 11a performs PWM, and the operation switch signal CS is set to an H level when the control circuit 11a performs PFM. In the preferred embodiment, the operation of the control circuit 11a is switched to PWM or PFM, as shown in FIG. 4. More specifically, when performing PWM, the control circuit 11a constantly operates in a continuous current mode (CCM). When performing PFM, the control circuit 11a operates in the continuous current mode or a discontinuous current mode (DCM). In the continuous current mode, the current IL flowing to the choke coil L1 continuously fluctuates during a switching cycle (see FIG. 8). The discontinuous current mode is an operation mode in which the current IL flowing to the choke coil L1 becomes zero during the switching cycle and causes the current IL to become discontinuous (see FIG. 9). The switching point of the continuous current mode and the discontinuous current mode is determined based on the choke coil L1, the input voltage Vi, the output voltage Vo, and the load (peak value of load current).

The first OR circuit 29 provides the first drive signal DH to the second driver circuit 28 as signal S5 in response to a operation switch signal CS having an L level during PWM. Furthermore, the first OR circuit 29 constantly generates the signal S5 with an H level irrespective of the first drive signal DH when the operation switch signal CS has an H level during PFM. In other words, the first OR circuit 29 functions to invalidate the first drive signal DH from the first driver circuit 26 during PFM.

The second driver circuit 28 is provided with the signal S4 of the one-shot circuit 27, the signal S5 of the first OR circuit 29, and an output signal S7 of a second OR circuit 31 serving as a detection signal invalidation circuit. The second driver circuit 28 performs a logical AND operation with the signal S4 of which level is inverted, the signal S5, and the signal S7 to generate the second drive signal DL, which indicates the operation result. Specifically, during PWM, the signal S7 from the second OR circuit 31 is constantly set to an H level when the operation switch signal CS has an L level. Thus, the second driver circuit 28 generates the second drive signal DL corresponding to the inverted level of the signal S4 from the one-shot circuit 27 and the signal S5 from the first OR circuit 29. During the PFM, the signal S5 from the first OR circuit 29 is constantly set to an H level by the operation switch signal CS having an H level. Thus, the second driver circuit 28 generates the second drive signal DL that is in accordance with the inverted signal S4 from the one-shot circuit 27 and the signal S7 from the second OR circuit 31.

The second drive signal DL is provided to the second MOS transistor T2. The second MOS transistor T2 is an N-channel MOS transistor in the preferred embodiment and includes a gate for receiving the second drive signal DL, a source coupled to the ground, and a drain coupled to the drain of the first MOS transistor T1. The second MOS transistor T2 is inactivated in response to a second drive signal DL having an L level and activated in response to a second drive signal DL having an H level.

The source and the drain of the second MOS transistor T2 are coupled to a second comparator 30 serving as a reversed flow detection circuit. Specifically, the inversion input terminal of the second comparator 30 is coupled to the drain of the second MOS transistor T2, and the non-inversion input terminal of the second comparator 30 is coupled to the source of the second MOS transistor T2. The second comparator 30 detects the current flowing to the choke coil L1 based on the potential at the source of the second MOS transistor T2 and the potential at the drain of the transistor T2. Then, the second comparator 30 provides the second OR circuit 31 with a signal S6 having an H level or L level in accordance with the detection result. In the preferred embodiment, the second comparator 30 generates the detection signal S6 at an H level to activate the second MOS transistor T2 when the current flows from ground towards the output terminal (load). Further, the second comparator 30 generates the detection signal S6 at an L level to inactivate the second MOS transistor T2 when the current flows from the output terminal towards ground.

The operation switch signal CS is provided to the second OR circuit 31 via an inverter circuit 32. The second OR circuit 31 performs a logical AND operation with the operation switch signal CS of which level is inverted and the detection signal S6 from the second comparator 30 to provide the signal S7 indicating the operation result to the second driver circuit 28. Specifically, during PWM, the second OR circuit 31 constantly generates the signal S7 at an H level irrespective of the detection signal S6 from the second comparator 30 when the signal from the inverter circuit 32 has an H level since the operation switch signal CS has an L level. In other words, the second OR circuit 31 functions to invalidate the detection signal S6 of the second comparator 30 during PWM. Furthermore, during PFM, the second OR circuit 31 receives a signal having an L level from the inverter circuit 32 since the operation switch signal CS has an H level and provides the detection signal S6 from the second comparator 30 to the second driver circuit 28 as the signal S7.

The second MOS transistor T2 and the second comparator 30, which are coupled as described above, form an ideal diode during PWM in which the detection signal S6 output from the second comparator 30 is valid. In the ideal diode, current flows in a forward direction when the forward voltage is zero and does not flow in the reverse direction due to infinite impedance. This obtains the ideal rectification property. Thus, the ideal diode suppresses the flow of reverse current to the second MOS transistor T2 (current flowing from the output terminal towards ground). Since forward voltage does not decrease, loss of the energy accumulated in the choke coil L1 is reduced when the first MOS transistor T1 is inactivated. This prevents the efficiency from being decreased under a light load.

The choke coil L1 is coupled to an output node N1 between the first MOS transistor T1 and the second MOS transistor T2. The current detection circuit 33 is coupled to the output node N1. The current detection circuit 33 detects the current flowing to the choke coil L1 based on the potential at the output node N1 and provides the current comparator 22 with the signal S8, which indicates a voltage proportional to the detected current.

The operation of the DC-DC converter 10a will now be discussed with reference to FIGS. 1 to 9.

First, the operation of the DC-DC converter 10a under a heavy load in which a large amount of power is supplied will be described. Under a heavy load, the peak value of the load current becomes high, and the voltage of the error signal S1 output from the error amplifier 21 is always higher than the second reference voltage Vr2. In this case, the oscillator 25 constantly oscillates in response to the operation control signal CT having an L level from the first comparator 24. The control circuit 11a thus performs PWM. When PWM is performed, the operation switch signal CS having an L level is provided from the external circuit (not shown) to the first OR circuit 29 and the second OR circuit 31. The first OR circuit 29 provides the first drive signal DH from the first driver circuit 26 to the second driver circuit 28 as the signal S5 in response to the operation switch signal CS having an L level. The second OR circuit 31 constantly provides the signal S7 having an H level to the second driver circuit 28 irrespective of the detection signal S6 from the second comparator 30 in response to the signal having an H level provided from the inverter circuit 32 based on the operation switch signal CS having an L level. That is, the second OR circuit 31 invalidates the detection signal S6 of the second comparator 30. The control circuit 11a thus performs PWM with the operation control signal CT having an L level provided from the first comparator 24 under a heavy load. Further, the control circuit 11a is virtually modified to the circuit shown in FIG. 2 by the operation switch signal CS having an L level. The operation of the DC-DC converter 10a under a heavy load will now be described with reference to FIGS. 2 and 5.

The first driver circuit 26 generates the first drive signal DH having an L level, and the second driver circuit 28 generates the second drive signal DL having an L level. The first MOS transistor T1 is activated in response to the first drive signal DH having an L level, and the second MOS transistor T2 is inactivated in response to the second drive signal DL having an L level.

If the first MOS transistor T1 is activated, the current IL flowing to the choke coil L1 increases and the output voltage of the current detection circuit 33 rises. When the level of the output signal S8 of the current detection circuit 33 becomes higher than the level of the error signal S1 output from the error amplifier 21, the signal S2 having an H level is provided to the set terminal S of the FF circuit 23. Therefore, the signal S3 of the FF circuit 23 is set to an H level and the first MOS transistor T1 is inactivated in response to the first drive signal DH having an H level from the first driver circuit 26. The second driver circuit 28 receives the first drive signal DH having an H level as the signal S5 having an H level. Thus, the second driver circuit 28 generates the second drive signal DL having an H level. This activates the second MOS transistor T2. That is, the second MOS transistor T2 is activated after the first MOS transistor T1 is inactivated. This discharges the energy accumulated in the choke coil L1.

The one-shot circuit 27 generates the pulse signal S4 in response to the rising edge of the clock signal CK output from the oscillator 25. The second driver circuit 28 generates the second drive signal DL having an L level in response to the pulse signal S4 on which level is inverted, and the second MOS transistor T2 is inactivated by the second drive signal DL having an L level. The second drive signal DL having an L level is provided to the first driver circuit 26. In this case, the signal S3 having an L level is provided to the first driver circuit 26 since the FF circuit 23 is reset by the rising edge of the clock signal CL. Therefore, the first driver circuit 26 generates the first drive signal DH having an L level, and the first MOS transistor T1 is activated by the first drive signal DH having an L level. That is, the first MOS transistor T1 is activated after the second MOS transistor T2 is inactivated. This accumulates energy in the choke coil L1.

Figure 2:
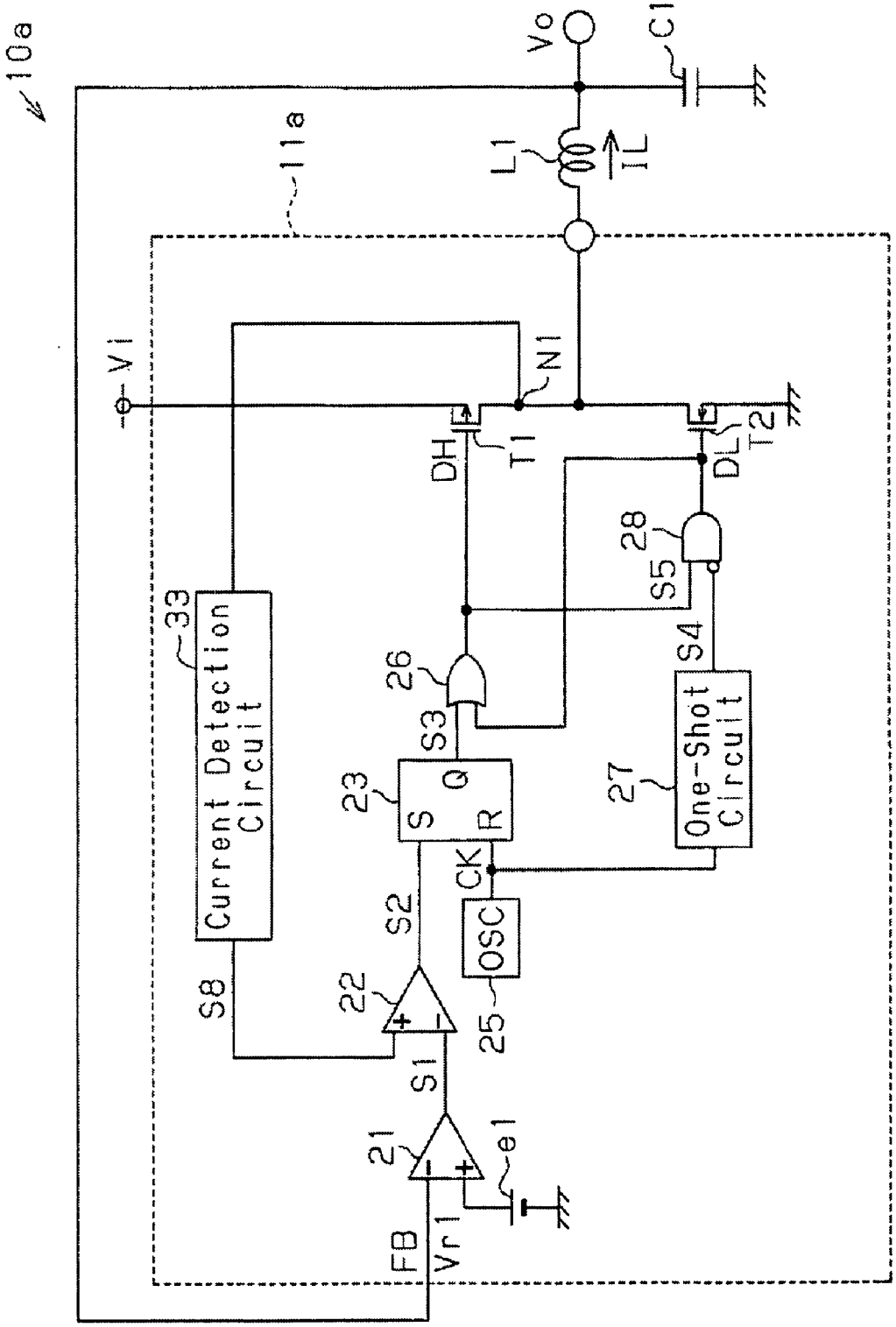
FIG. 2 is an equivalent circuit diagram of the DC-DC converter of FIG. 1 during PWM.

The first driver circuit 26 and the second driver circuit 28 respectively generate the first drive signal DH and the second drive signal DL based on the signal S3 and the pulse signal S4 so as to activate and inactivate the first and second MOS transistors T1 and T2 in a complementary manner so that they are not simultaneously activated. In other words, the control circuit 11a that is virtually modified as shown in FIG. 2 performs synchronous rectification on the first and second MOS transistors T1 and T2. The setting of switching point of the PWM and the PFM as described above constantly operates the control circuit 11a in the continuous current mode (CCM) when PWM is performed (see FIG. 4). Thus, reverse current is not generated in the second MOS transistor T2 when PWM is performed even if the detection signal S6 from the second comparator 30 is invalidated. Accordingly, the conversion efficiency is not lowered by reverse current during PWM.

During the operation of the first MOS transistor T1 as described above, when the output voltage Vo decreases, the voltage of the error signal s1 rises and the time until the output signal S2 of the current comparator 22 shifts to an H level is prolonged. Thus, the ON time of the first MOS transistor T1 is prolonged. Furthermore, when the output voltage Vo rises, the voltage of the error signal S1 decreases, and the time until the output signal of the current comparator 22 shifts to an H level is shortened. Therefore, the ON time of the first MOS transistor T1 is shortened. Such operations activate the first MOS transistor T1 in a predetermined cycle based on the output signal frequency of the oscillator 25. The timing at which the first MOS transistor T1 is inactivated is determined by the output current IL. That is, the activation timing of the first MOS transistor T1 is changed in accordance with the level of the output voltage Vo so keep the output voltage Vo constant.

Figure 6:
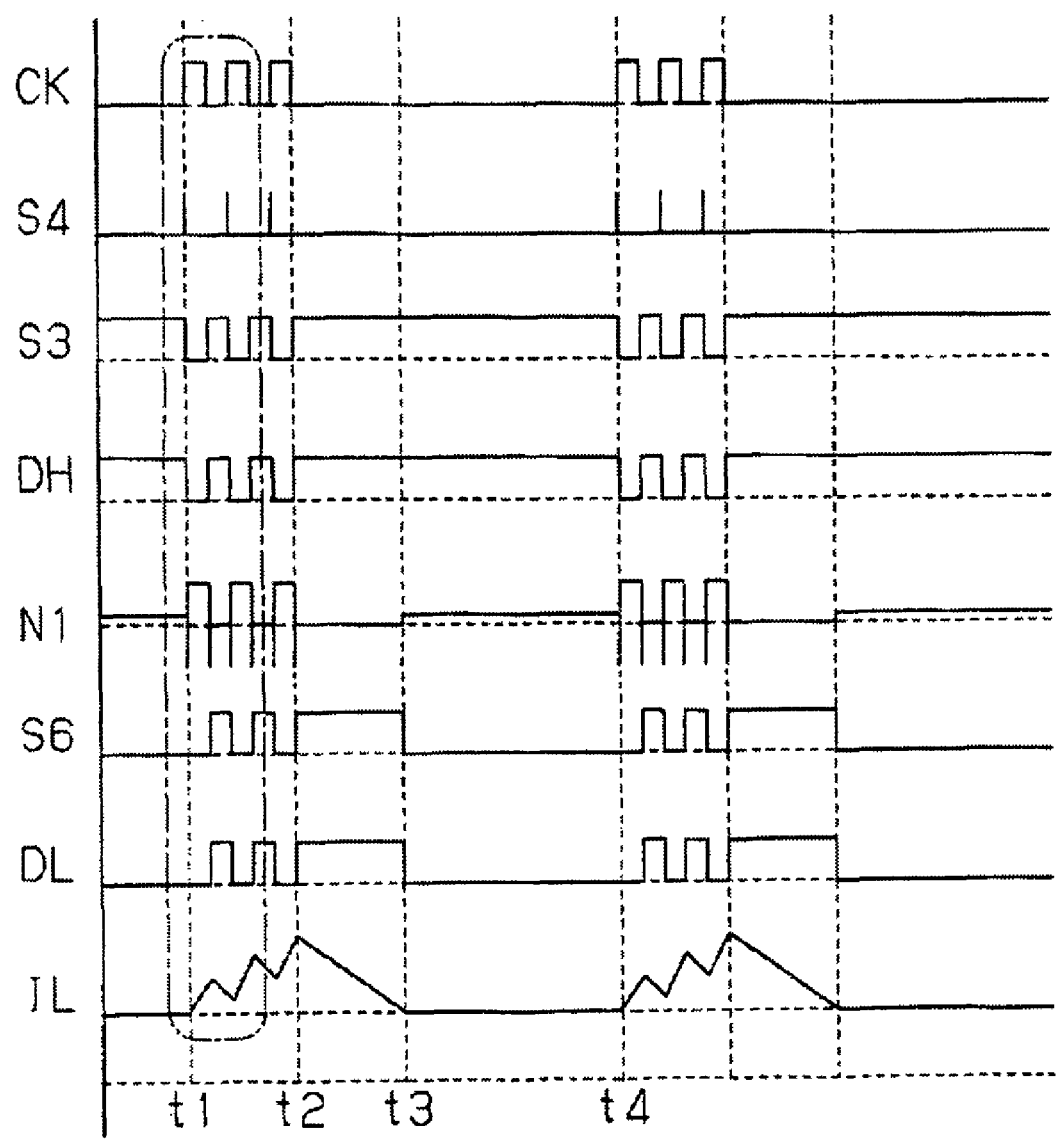
FIG. 6 is a waveform chart illustrating the operation of the DC-DC converter shown in FIG. 1 in a continuous current mode (CCM) during PFM.
Figure 7:
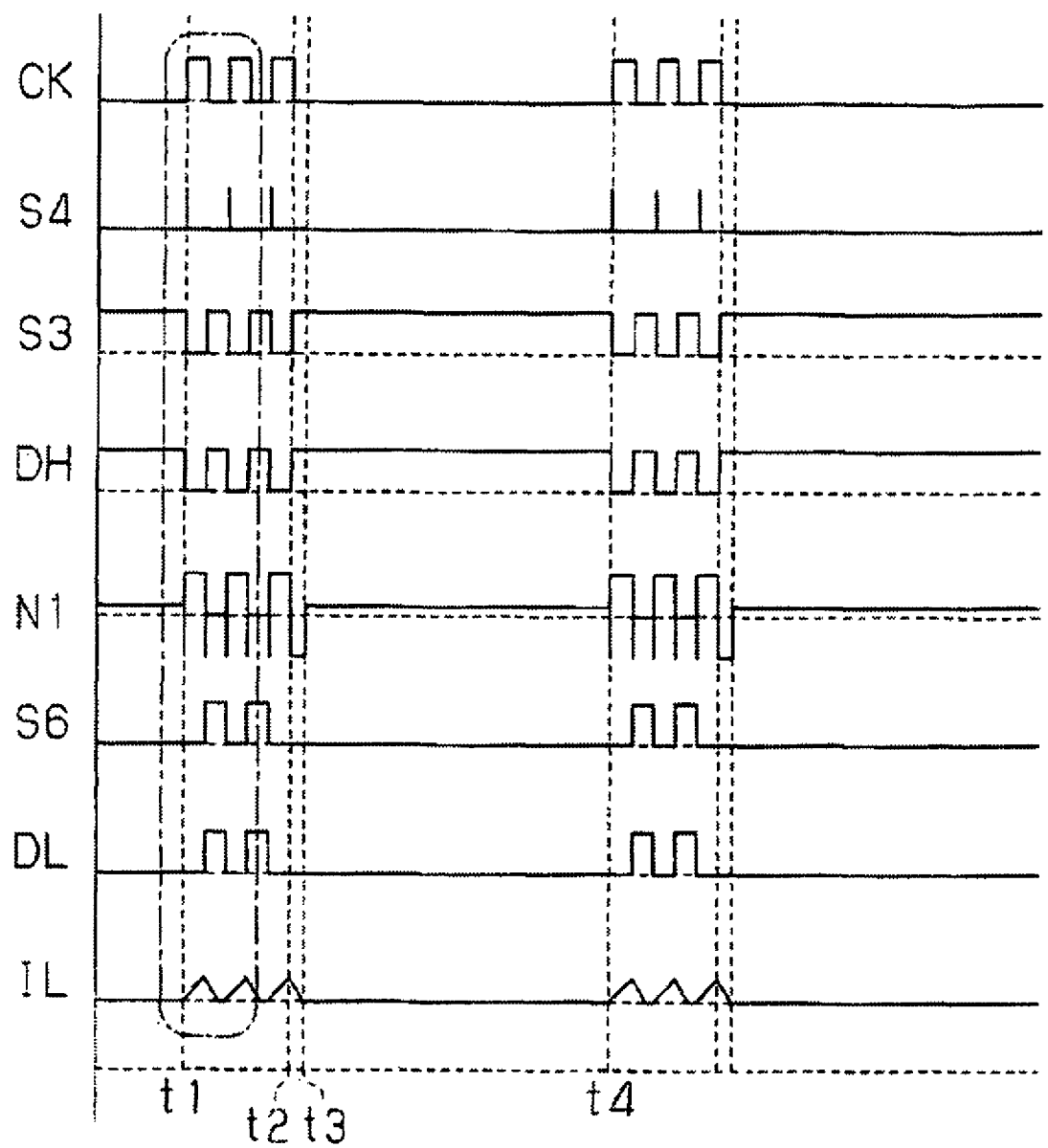
FIG. 7 is a waveform chart illustrating the operation of the DC-DC converter shown in FIG. 1 in a discontinuous current mode (DCM) during PFM.
Figure 8:
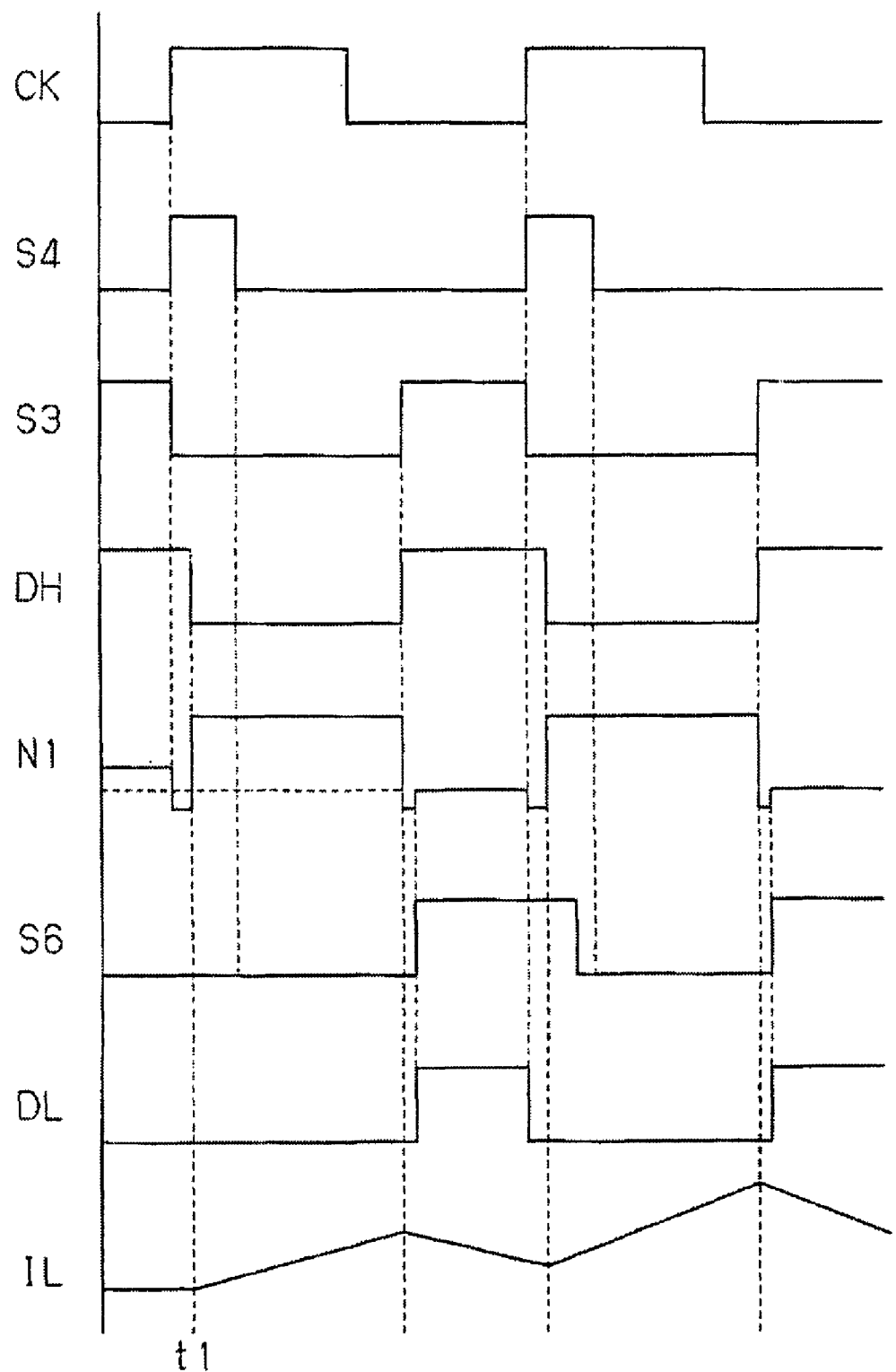
FIG. 8 is an enlarged view showing the section encompassed by the broken line in FIG. 6.
Figure 9:
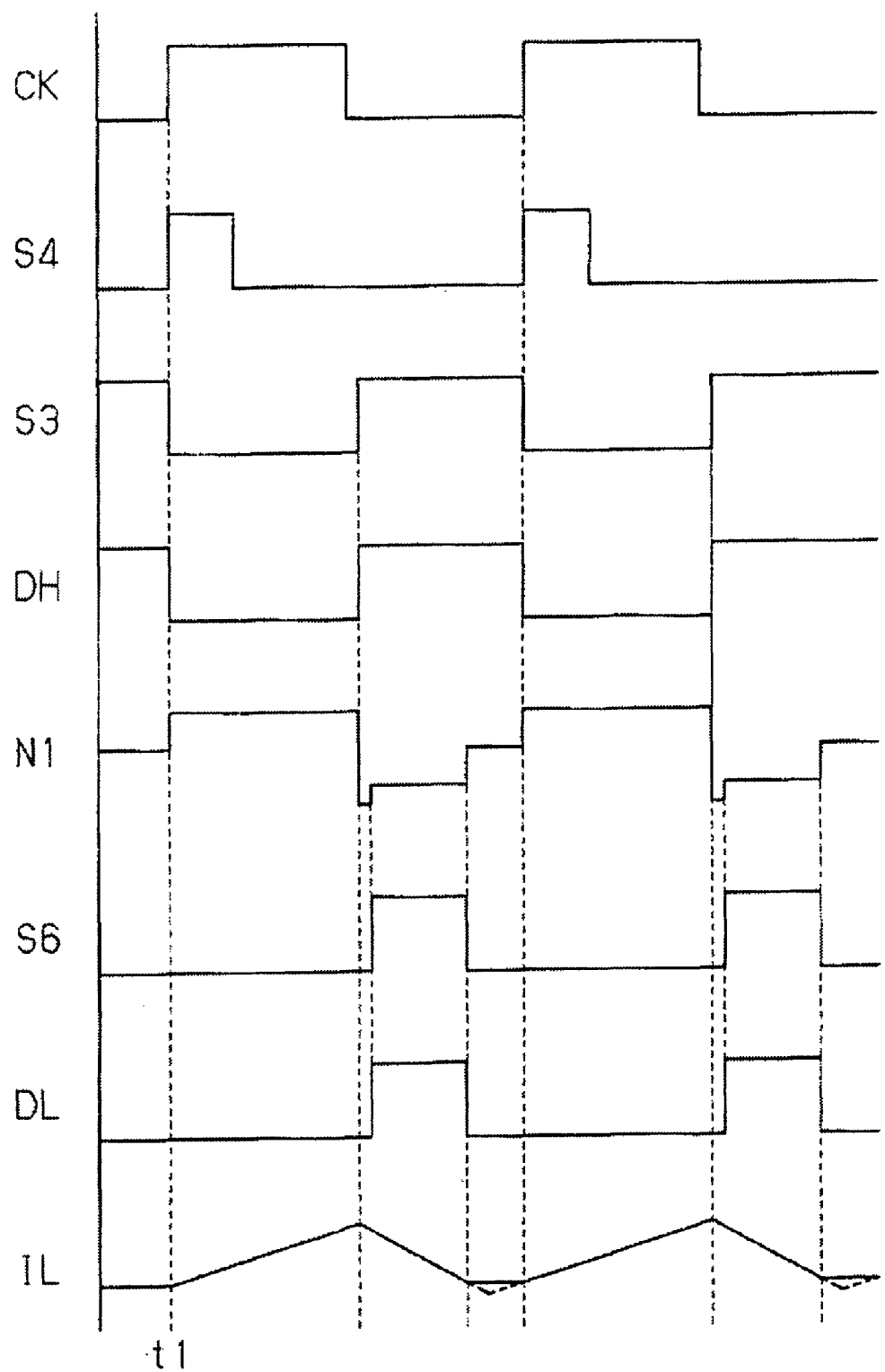
FIG. 9 is an enlarged view showing the section encompassed by the broken line in FIG. 7.

The operation of the DC-DC converter 10a under a light load in which a small amount of power is supplied will now be described. Under a light load, the peak value of the load current becomes low, and the voltage of the error signal S1 output from the error amplifier 21 becomes higher or lower than the second reference voltage Vr2. In this case, the first comparator 24 provides the operation control signal CT having an H level or L level to the oscillator 25. The oscillator 25 oscillates when the operation control signal CT has an L level and the oscillator 25 stops oscillating when the operation control signal CT has an H level. This intermittently operates the oscillator 25, and the control circuit 11 performs PFM. When PFM is performed, the operation switch signal CS having an H level is provided from the external circuit (not shown) to the first OR circuit 29 and the second OR circuit 31. The first OR circuit 29 constantly provides the signal S5 having an H level to the second driver circuit 28 irrespective of the first drive signal DH from the first driver circuit 26 in response to the operation switch signal CS having an H level. That is, the first OR circuit 29 invalidates the first drive signal DH of the first driver circuit 26. The second OR circuit 31 provides the detection signal S6 from the second comparator to the second driver circuit 28 as the signal S7 in response to the signal having an L level provided from the inverter circuit 32 based on the operation control signal CT having an H level. Thus, under a light load, the control circuit 11a performs PFM with the operation control signal CT having an L level or H level provided from the first comparator 24. Further, the operation switch signal CS having an H level virtually modifies the control circuit 11a as shown in FIG. 3. The operation of the DC-DC converter 10a under a light load will now be described with reference to FIG. 3 and FIGS. 6 to 9, which show a waveform during PFM. FIG. 6 is a waveform chart showing operation in the continuous current mode (CCM), and FIG. 7 is a waveform chart showing operation in the discontinuous current mode (DCM). FIGS. 8 and 9 are enlarged views of FIGS. 6 and 7, respectively.

As shown in FIGS. 6 and 7, during a period in which the output voltage Vo is low, that is, during time t1 to t2, the voltage of the error signal S1 output from error amplifier 21 becomes high and the voltage of error signal S1 becomes higher than the second reference voltage Vr2. Accordingly, the operation control signal CT having an L level is output from the first comparator 24, and the oscillator 25 performs oscillation.

As shown in FIGS. 8 and 9, the first driver circuit 26 outputs the first drive signal DH having an L level, and the second driver circuit 28 outputs the second drive signal DL having an L level at time t1. The first MOS transistor T1 is activated in response to the first drive signal having an L level, and the second MOS transistor T2 is inactivated in response to the second drive signal DL having an L level.

When the clock signal CK output from the oscillator 25 falls and the signal S2 (omitted in FIGS. 8 and 9) corresponding to the output voltage Vo rises to an H level, the FF circuit 23 outputs the signal S3 having an H level. The first driver circuit 26 outputs the first drive signal DH having an H level, and the first MOS transistor T1 is inactivated in response to the first drive signal DH having an H level.

When the first MOS transistor T1 is inactivated, the energy accumulated in the choke coil L1 generates negative voltage at the output node N1. That is, the current flows from ground towards the output terminal through a body diode of the second MOS transistor T2. Therefore, the second comparator 30 outputs the detection signal S6 having an H level. In this case, the second driver circuit 28 outputs the second drive signal DL having an H level since the pulse signal S4 from the one-shot circuit 27 has an L level. Accordingly, the second MOS transistor T2 is activated. The second comparator 30 outputs the signal S6 having an H level after the first MOS transistor T1 is inactivated. That is, after the first MOS transistor T1 is inactivated, the second MOS transistor T2 is activated when a delay time caused by the signal S6 elapses. In other words, the second MOS transistor T2 is activated in a state in which the first and second MOS transistors T1 and T2 are both inactivated. In this case, the voltage drop that occurs in the second MOS transistor T2 is small compared to the decrease in the forward voltage. This improves the conversion efficiency of the entire DC-DC converter 10a.

The one-shot circuit 27 outputs the pulse signal S4 having an H level and a predetermined pulse width in response to the rising edge of the clock signal CK. Accordingly, the second driver circuit 28 outputs the second drive signal DL having an L level during the period the pulse signal S4 has an H level. The second MOS transistor T2 is inactivated in response to the second drive signal DL having an L level. The second drive signal DL having an L level is provided to the first driver circuit 26. In this case, the FF circuit 23 is reset by the clock signal CK. Thus, the signal S3 having an L level is provided to the first driver circuit 26. The first driver circuit 26 then outputs the first drive signal DH having an L level. The first MOS transistor T1 is activated in response to the first drive signal DH having an L level. That is, the first MOS transistor T1 is activated after the second MOS transistor T2 is inactivated. In other words, the first MOS transistor T1 is activated in a state in which the first and second MOS transistors T1 and T2 are both inactivated. As described above, the second MOS transistor T2 remains inactivated until a time corresponding to the predetermined pulse width, or the pulse width of the pulse signal S4, elapses from the rise of the clock signal CK. This prevents the first and second MOS transistors T1 and T2 from both being activated. Thus, the generation of tunneling current is suppressed.

When the first MOS transistor T1 is activated, the input voltage Vi increases the voltage at the output node N1. Thus, the second comparator 30 outputs the detection signal S6 having an L level when the first MOS transistor T1 is activated. The detection signal S6 having an L level is provided to the second driver circuit 28 (actually, the signal S7 having an L level is provided to the second driver circuit 28 based on the operation switch signal CS having an H level and the detection signal S6 having an L level as shown in FIG. 1). Accordingly, the second MOS transistor T2 is kept inactivated by the detection signal S6 of the second comparator 30 even after the pulse signal S4 output from the one-shot circuit 27 shifts to an L level.

Referring to FIG. 9, when the peak value of the load current becomes low, the current IL flowing to the choke coil L1 becomes negative (refer to the broken line in FIG. 9) during the time the second MOS transistor T2 is activated. Therefore, reverse current flows from the output terminal towards the ground through the second MOS transistor T2. The second comparator 30 detects the reverse current and provides the second driver circuit 28 with the detection signal S6 having an L level to inactivate the second MOS transistor T2. Actually, the signal S7 (refer to FIG. 1) having an L level is provided to the second driver circuit 28. The second driver circuit 28 outputs the second drive signal DL having an L level in response to the detection signal S6 (signal S7) having an L level. This inactivates the second MOS transistor T2. When the second MOS transistor T2 is inactivated, the ideal diode formed by the second MOS transistor T2 and the second comparator 30 has infinite impedance in the reverse direction. This prevents the flow of reverse current in the second MOS transistor T2. That is, current IL flowing to the choke coil L1 becomes substantially zero during the switching cycle. Thus, fluctuations in the current IL become discontinuous (discontinuous current mode).

As shown in FIGS. 6 and 7, when the above described switching operation is repeated and the output voltage Vo rises to the predetermined voltage Vo (time t2), the voltage of the error signal S1 output from the error amplifier 21 becomes lower than the second reference voltage Vr2. Thus, the first comparator 24 outputs the operation control signal CT having an H level, and the oscillator 25 stops oscillation.

When the oscillation of the oscillator 25 is stopped, the clock signal CK having an H level is not output. Thus, the FF circuit 23 is not reset. Accordingly, the FF circuit 23 constantly outputs the signal S3 having an H level. The first driver circuit 26 then outputs the first drive signal DH having an H level during the period the oscillation is stopped (time t2 to time t4), and the first MOS transistor T1 is inactivated in response to the first drive signal DH.

When the first MOS transistor T1 is inactivated, the energy accumulated in the choke coil L1 (refer to FIG. 6) generates negative voltage at the output node N1. Thus, the second comparator 30 outputs the detection signal S6 having an H level. In this state, the suspension of the oscillation causes the one-shot circuit 27 to output the signal S4 at an L level. Thus, the second driver circuit 28 output the second drive signal DL having an H level. Accordingly, the second MOS transistor T2 is activated. The voltage drop in the second MOS transistor T2 is small compared to the voltage drop in the diode forward direction. This improves the conversion efficiency of the entire DC-DC converter 10a.

When the current IL flowing to the choke coil L1 becomes negative, reverse current flows from the output terminal towards the ground through the second MOS transistor T2 (time t3). The second comparator 30 detects the reverse current and outputs the detection signal S6 having an L level to inactivate the second MOS transistor T2. The second driver circuit 28 outputs the second drive signal DL having an L level in response to the detection signal S6 having an L level. This inactivates the second MOS transistor T2. Accordingly, the flow of reverse current in the second MOS transistor T2 is suppressed. Subsequently, when the output voltage Vo lowers to a predetermined voltage (time t4), the voltage of the error signal S1 output from the error amplifier 21 becomes higher than the second reference voltage Vr2, and the operation control signal CT having an L level is output from the second comparator 30. This restarts oscillation.

As described above, the second MOS transistor T2 operates as an ideal diode when PFM is performed. Thus, reverse current (current flowing from output terminal towards ground) is suppressed. Furthermore, voltage drop forward the forward direction is reduced compared to a semiconductor diode. Accordingly, the second MOS transistor T2 operating as the ideal diode reduces loss of the energy accumulated in the choke coil L1 when the first MOS transistor T1 is inactivated. This improves the conversion efficiency under a light load. Further, since the second MOS transistor T2 is inactivated during activation and inactivation of the first MOS transistor T1, the MOS transistors T1 and T2 are not simultaneously activated, and the flow of tunneling current to the two MOS transistors T1 and T2 is suppressed.

The DC-DC converter 10a of the preferred embodiment has the advantages described below.

(1) The operation switch signal CS for switching between PWM and the PFM virtually modifies the control circuit 11a to the circuit of FIG. 2 (PWM) or the circuit of FIG. 3 (PFM). The control circuit 11a is set so as to constantly operate in the continuous current mode when PWM is performed.

Therefore, when PWM is performed under a heavy load, synchronous rectification for activating and inactivating the first and second MOS transistors T1 and T2 in a complementary manner is performed. This maintains high conversion efficiency. When PFM is performed under a light load, the second comparator 30 operates the second MOS transistor T2 as an ideal diode. Thus, reverse current is suppressed, and forward voltage drop is reduced. This improves the conversion efficiency when the load is light.

The second comparator 30 may operate 30 the second MOS transistor T2 as an ideal diode in both of PWM and PFM. In this case, however, the activation and inactivation of the second MOS transistor T2 may be delayed by the signal delay of the second comparator 30. Specifically, the second MOS transistor T2 is activated by the detection signal S6 having an H level output from the second comparator 30 when the first MOS transistor T1 is inactivated. In this state, the signal delay of the second comparator 30 delays the signal S6 having an H level from the second comparator 30 and delays the activation of the second MOS transistor T2. This prolongs the period during which the first MOS transistor T1 and the second MOS transistor T2 are both inactivated. In the preferred embodiment, during PWM in which there is no possibility of reverse current being generated, synchronous rectification control is performed to activate and inactivate the first and second MOS transistors T1 and T2 in a complementary manner. Thus, the period in which the first and second MOS transistors T1 and T2 are both inactivated is shortened. That is, during synchronous rectification control, the first drive signal DH having an L level that inactivates the first MOS transistor T1 is directly provided to the second driver circuit 28. Accordingly, the second driver circuit 28 generates the second drive signal DL having an H level for activating the second MOS transistor T2 based on the first drive signal DH with practically no delay. Thus, the period in which the first and second MOS transistors T1 and T2 are both inactivated is shortened in the synchronous rectification control as compared to diode rectification control in which the second transistor T2 is operated as an ideal diode.

(2) When PFM is performed, the one-shot circuit 27 and the input of the second drive signal DL from the second driver circuit 28 to the first driver circuit 26 inactivates the second MOS transistor T2 before and after the activation of the first MOS transistor T1. As a result, the first and second MOS transistors T1 and T2 are not simultaneously activated, and tunneling current is suppressed.

A DC-DC converter 10b according to another embodiment will now be discussed with reference to FIGS. 10 and 11. This embodiment differs from the above embodiment in that the operation switch signal CS is provided to a second comparator 40. The control circuit 11b of the second embodiment has substantially the same configuration as the control circuit 11a shown in FIG. 1.

Figure 10:
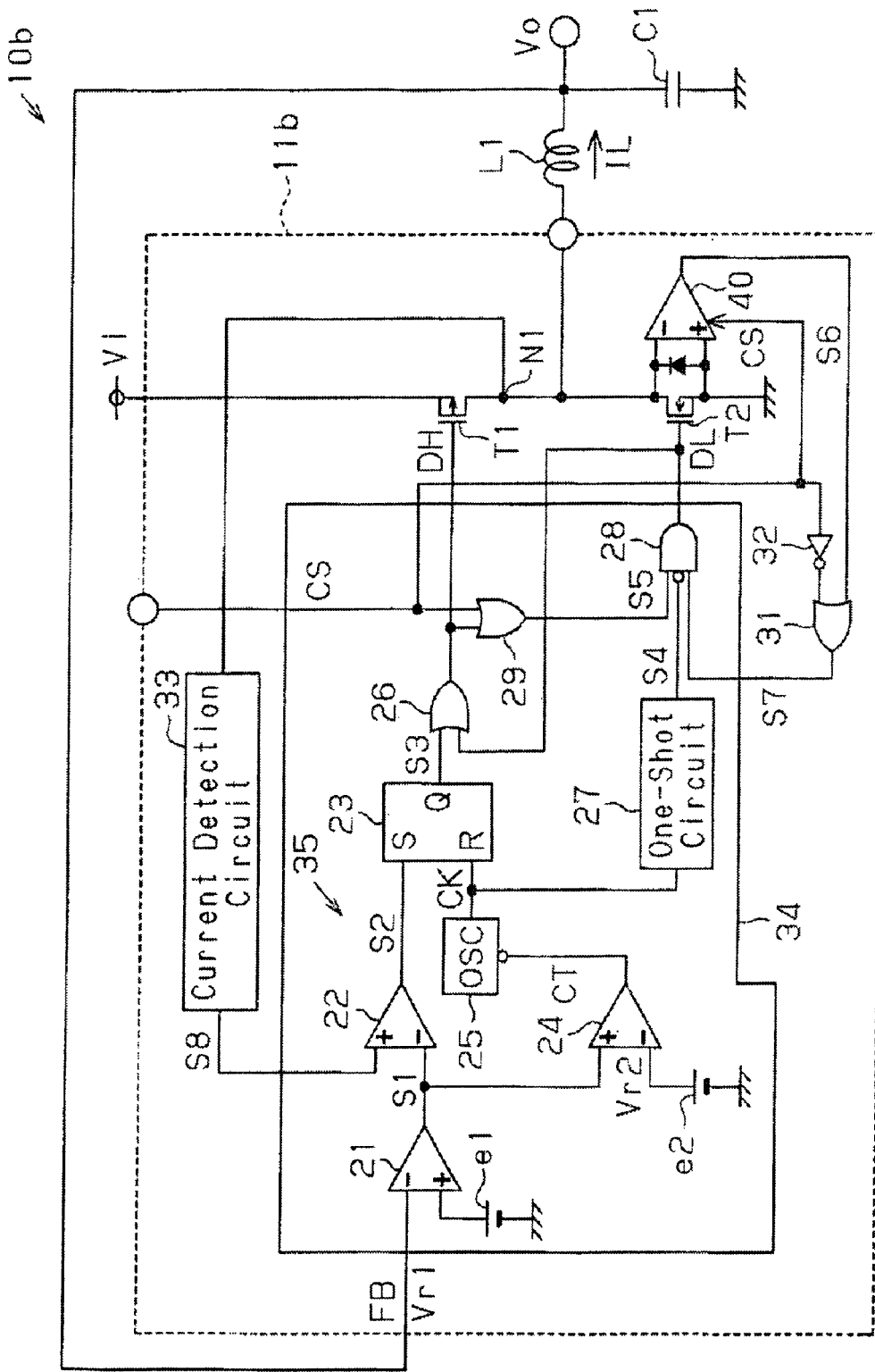
FIG. 10 is a schematic circuit diagram of a DC-DC converter according to another embodiment.

As shown in FIG. 10, the operation switch signal CS is provided as a shut-down signal to the second comparator 40, which is coupled to the source and drain of the second MOS transistor T2. That is, the operation switch signal CS is a signal that activates or deactivates the second comparator 40. Specifically, the second comparator 40 operates normally when the operation switch signal CS has an H level, and stop operating when the operation switch signal CS has an L level. As described above, the operation switch signal CS is set to an H level during PFM, and the operation switch signal CS is set to an L level during PWM. Thus, the second comparator 40 operates normally when PFM is performed and stops operating when PWM is performed.

Figure 11:
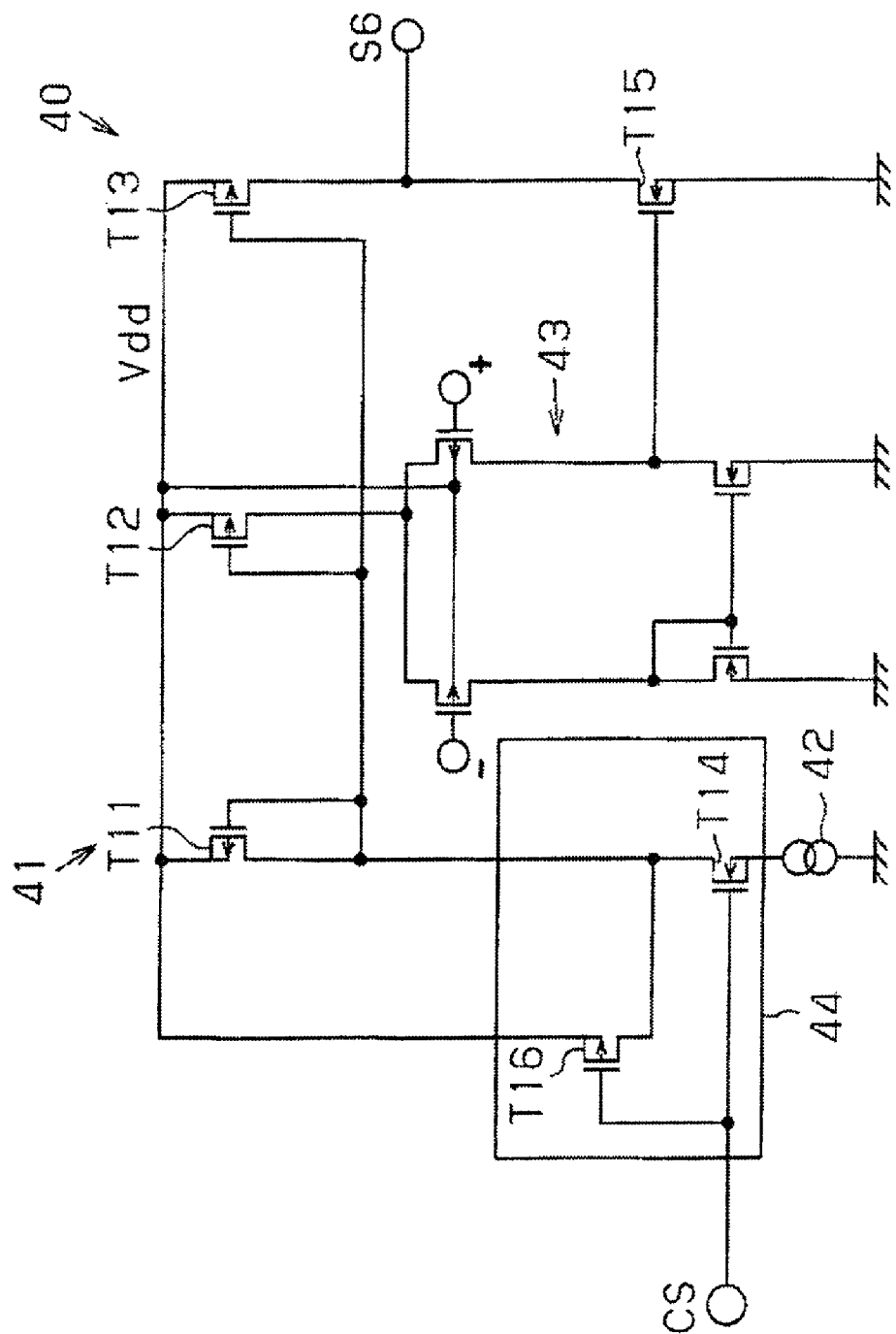
FIG. 11 is a schematic circuit diagram of a second comparator shown in FIG. 10.

As shown in FIG. 11, the second comparator 40 includes a current mirror 41 coupled to a high potential power supply Vdd. The current mirror 41 includes three transistors T11, T12, and T13. The first transistor T11 is coupled to a first constant current source 42 via an N-channel MOS transistor T14. The gates of the transistors T11, T12, and T13 are coupled to the drain of a fourth transistor T14. The drain of the second transistor T12 is coupled to a differential amplifier 43. The drain of the third transistor T13 is coupled to an output transistor T15. A P-channel MOS transistor T16 is coupled between the sources of the transistors T11, T12, and T13 and the gates of the transistors T11, T12, and T13. The operation switch signal CS is provided to the gate of the fourth transistor T14 and the gate of the sixth transistor T16. The fourth transistor T14 and the sixth transistor T16 form a coupling circuit 44.

When the operation switch signal CS has an H level, the fourth transistor T14 is activated, the current mirror 41 is coupled to the first constant current source 42, and the sixth transistor T16 is inactivated. As a result, current from the first constant current source 42 flows to the differential amplifier 43 and the output transistor T15. Thus, the second comparator 40 is normally operated.

When the operation switch signal CS has an L level, the fourth transistor T14 is inactivated, the current mirror 41 is uncoupled from the first constant, current source 42, and the sixth transistor T16 is activated. This short-circuits the source and gate of each of the transistors T11, T12, and T13 forming the current mirror 41. Thus, the supply of current to the differential amplifier 43 is stopped, and the second comparator 40 stops operating.

The DC-DC converter 10b of this embodiment has the following advantage in addition to advantages (1) and (2) of the DC-DC converter 10a.

(3) During PWM, the function of the second comparator 40 becomes unnecessary since the detection signal S6 is invalidated by the second OR circuit 31 (see FIG. 1). Accordingly, when PWM is performed, the control circuit 11b provides the operation switch signal CS having an L level to the second comparator 40 and stops operating the second comparator 40. This reduces unnecessary power consumption by the second comparator 40 and reduces the power consumption of the entire DC-DC converter 10b.

A DC-DC converter according to a further embodiment will now be discussed with reference to FIG. 12. In this embodiment, the second comparator 40 of FIG. 11 is replaced by a second comparator 50 as shown in FIG. 12.

In the DC-DC converter of this embodiment, the operation switch signal CS from an external circuit (not shown) is provided to the second comparator 50, which is coupled to the source and the drain of the second MOS transistor T2. The operation switch signal CS functions as a power down signal. That is, the operation switch signal CS is a signal for operating the second comparator 50 in a normally mode or a low power consumption mode. Specifically, the second comparator 50 operates normally by when the operation switch signal CS has an H level and operates in the low power consumption mode when the operation switch signal CS has an L level. As described above, the operation switch signal CS has an H level during PFM and an L level during PWM. Thus, the second comparator 50 operates normally when PFM is performed and operates in the low power consumption mode when PWM is performed.

Figure 12:
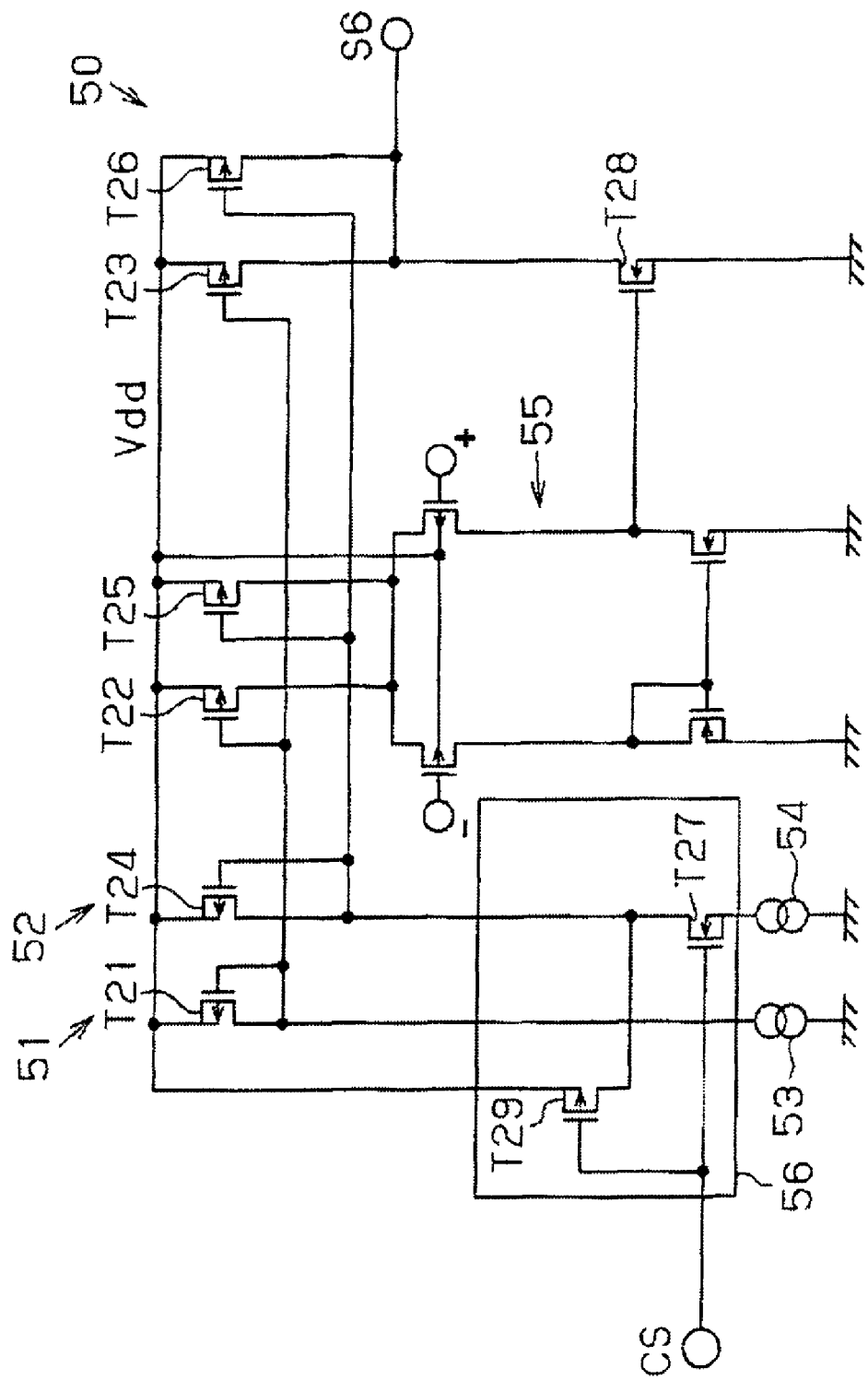
FIG. 12 is a schematic circuit diagram of a second comparator in a further embodiment.

As shown in FIG. 12, the second comparator 50 includes a first current mirror 51 and a second current mirror 52 coupled to the high potential power supply Vdd. The first current mirror 51 includes three transistors T21, T22, and T23, and the second current mirror 52 includes three transistors T24, T25, and T26. The drain of the first transistor T21 is coupled to a first constant current source 53, and the fourth transistor T24 is coupled to a second constant current source 54 via an N-channel MOS transistor T27. The gates of the transistors T24, T25, and T26 are coupled to the drain of the seventh transistor T27. The drain of the second transistor T22 and the drain of the fifth transistor T25 are coupled to a differential amplifier 55. The drain of the third transistor T23 and the drain of the sixth transistor T26 are coupled to an output transistor T28. Furthermore, a P-channel MOS transistor T29 is coupled between the sources of the transistors T24, T25, and T26 and the gates of the transistors T24, T25, and T26. The operation switch signal CS is provided to the gate of the seventh transistor T27 and the gate of the ninth transistor T29. The seventh transistor T27 and the ninth transistor T29 form a coupling circuit 56.

When the operation switch signal has an H level, the seventh transistor T27 is activated, the second current mirror 52 is coupled to the second constant current source 54, and the ninth transistor T29 is inactivated. Thus, the current from the first and second constant current sources 53 and 54 flow to the differential amplifier 55 and the output transistor T28. As a result, the second comparator 50 operates normally.

When the operation switch signal has an L level, the seventh transistor T27 is inactivated, the second current mirror 52 is uncoupled from the second constant current source 54, and the ninth transistor T29 is activated. This short-circuits the source and gate of each of the transistor T24, T25, and T26 forming the second current mirror 52. Thus, current from the first constant current source 53 flows to the differential amplifier 55 and the output transistor T28. Thus, the second comparator 50 operates in a low power consumption mode.

The DC-DC converter of the third embodiment has the following advantage in addition to advantages (1) and (2) of the DC-DC converter 10a described above.

(4) When PWM is performed, the function of the second comparator 40 is unnecessary since the detection signal S6 is invalidated by the second OR circuit (see FIG. 1). Accordingly, when PWM is performed, the second comparator 50 operates to consume low current (low power consumption mode) in response to the operation switch signal CS having an L level. Specifically, the second comparator 50 operates in the low power consumption mode of which power consumption is about one half of that in the normal operation mode. This reduces unnecessary power consumption by the second comparator 50. Furthermore, the output level of the differential amplifier 55 and the output transistor T28 is maintained since the second comparator 50 operates with one half of the current for normal operation. This improves response when shifting from the low power consumption mode to the normal operation mode compared to that when stopping operation of the second comparator 50.

It should be apparent to those skilled in the art that the aforementioned embodiments may be embodied in many other specific forms without departing from the spirit or scope of the embodiments. Particularly, it should be understood that the embodiments may be embodied in the following forms.

Figure 13:
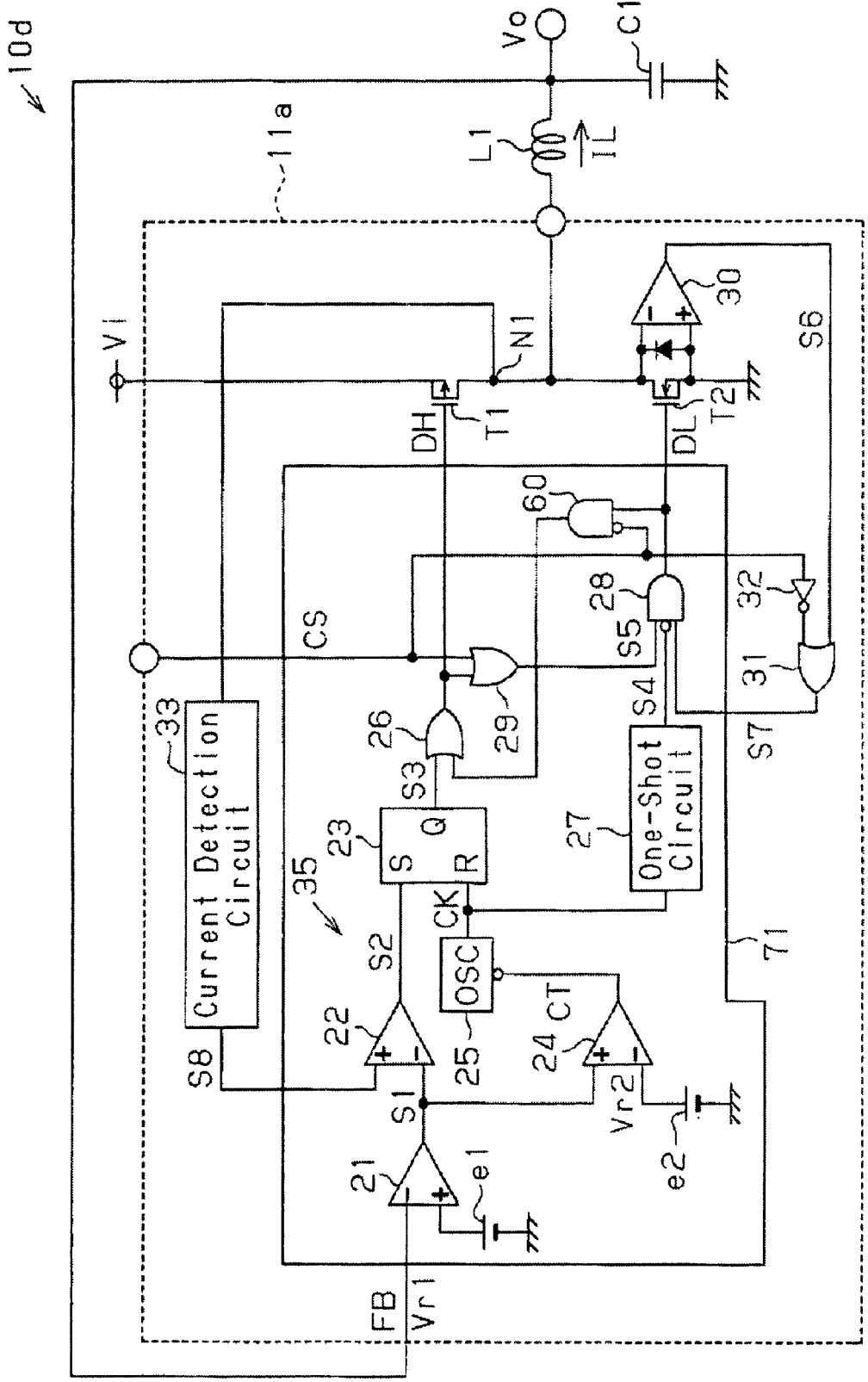
FIG. 13 is a schematic circuit diagram of a modified DC-DC converter.

FIG. 13 is a schematic circuit diagram of a modified DC-DC converter 10d. A drive control circuit 71 of the DC-DC converter 10d is configured by adding a drive signal invalidation circuit 60 to the circuit 34 shown in FIG. 1. The drive signal invalidation circuit 60 invalidates the second drive signal DL output from the second driver circuit 28 during PFM. The drive signal invalidation circuit 60 is configured by, for example, an AND circuit and operates based on the second drive signal DL and the inverted level of the operation switch signal CS. Specifically, during PWM, the drive signal invalidation circuit 60 provides the second drive signal DL output from the second driver circuit 28 to the first driver circuit 26 in response to the operation switch signal CS having an L level. During PFM, the drive signal invalidation circuit 60 constantly provides a signal having an L level to the first driver circuit 26 irrespective of the signal level of the second drive signal DL in response to the operation switch signal CS having an H level. That is, the invalidation circuit 60 invalidates the second drive signal LD during PFM.

The one-shot circuit 27 in each embodiment may be omitted. In this case, the signal S3 output from the FF circuit 23 is provided to the second driver circuit 28 in lieu of the clock signal CK.

The operation switch signal CS in each embodiment may be provided from the load. Alternatively, a determination circuit arranged outside or inside the DC-DC converter 10a may determine the state of the load, and the output signal of the determination circuit may be used as the operation switch signal CS.

In each embodiment, the level of the operation switch signal CS is shifted when the driving method of the control circuit (11a or 11b) switches between PWM and PFM. That is, the operation switch signal CS having an L level is constantly provided to the control circuit when PWM is performed. The timing for shifting the level of the operation switch signal CS may be to any timing within the driving period in the PWM. In other words, the operation switch signal CS may be set to an L level for only a certain period of PWM.

The first OR circuit 29 in each embodiment may be omitted.

The second OR circuit 31 and the inverter circuit 32 in the second embodiment (FIGS. 10 and 11) may be omitted. In other words, the comparator 40 of the second embodiment may stop operating in response to the operation switch signal CS (functioning as a shut-down signal). Therefore, the detection signal S6 may be invalidated with the operation control signal CS even if the second OR circuit 31 and the inverter circuit 32 are not employed.

In each embodiment, the drive signal invalidation circuit is not limited to the first OR circuit 29. The drive signal invalidation circuit is configured to generate the first drive signal DH from the first driver circuit 26 as the signal S5 in accordance with the operation switch signal CS of the first signal level (e.g., L level) and invalidate the first drive signal DH from the first driver circuit 26 in accordance with the operation switch signal CS of the second signal level (e.g., H level).

In each embodiment, the detection signal invalidation circuit is not limited to the second OR circuit 31 and the inverter circuit 32. The detection signal invalidation circuit is configured to generate the detection signal S6 from the second comparator 30 as the signal S7 in accordance with the operation switch signal CS of the first signal level (e.g., H level) and invalidate the first drive signal DH from the first driver circuit 26 in accordance with the operation switch signal CS of the second signal level (e.g., H level).

In each embodiment, the first and second driver circuits is not limited to the first and second driver circuits 26 and 28. The first and second driver circuits are configured to generate the first and second drive signals DH and DL to activate and inactivate the first and second MOS transistors T1 and T2 in a complementary manner so that the output voltage Vo becomes constant.

In each embodiment, instead of controlling the operation of the oscillator 25 with the first comparator 24, an operation switching circuit for controlling the operation of the oscillator 25 based on the operation switch signal CS may be used.

The pseudo-PFM performed in each embodiment may be true PFM. In this case, a PFM operation circuit for switching the switching frequency in accordance with the output voltage Vo must be arranged separately from the oscillator 25. The PFM operation circuit includes a triangular wave oscillator for generating a triangular wave of a predetermined cycle, a reference voltage generation circuit for generating a varying reference voltage, and a pulse signal generation circuit for comparing the triangular wave and the reference voltage in order to generate a pulse signal based on the comparison result.

In each embodiment, the first MOS transistor T1 and the second MOS transistor T2 may be externally coupled to the control circuits 11a and 11b.

In each embodiment, each of the first and second transistors may be an N-channel MOS transistor or a P-channel MOS transistor. In this case, the output level of the first driver circuit 26 and the second driver circuit 28 must be changed in accordance with the conductivity type of the transistors.

In each embodiment, instead of preventing the flow of reverse current to the second MOS transistor T2 with an ideal diode formed by the second MOS transistor T2 and the second comparator 30, the flow of reverse current may be prevented by other configurations. A resistor may be coupled between the second MOS transistor T2 and ground, a comparator may be coupled to the terminals of the resistor, and the second MOS transistor T2 may be inactivated by detecting the reverse current based on the potential difference between the terminals of the resistor.

In each embodiment, a DC-DC converter using a PWM comparator may be used in place of the DC-DC converter using the RS-flip-flop circuit (FF circuit) 23.

In the second comparator 50 of the third embodiment (FIG. 12), instead of reducing the amount of current by about one half by uncoupling the second current mirror 52 and the second constant current source 54, the amount of current may be reduced by about one third by combining three or more current sources.

In each embodiment, the comparator configuring the ideal diode may be provided with an offset. In this case, the offset reduces the fluctuation amount in the potential of the output signal with respect to the fluctuation amount in the potential of the input signal. Further, the offset voltage may be variable.

In each embodiment, a voltage control type DC-DC converter may be used in place of the current control type DC-DC converter.

In each embodiment, a step-up DC-DC converter may be used in place of the step-down DC-DC converter.

In each embodiment, instead of comparing the output voltage Vo (feedback signal FB) and the first reference voltage Vr1 with the error amplifier 21, the error amplifier 21 may compare the first reference voltage Vr1 with a divided voltage, which is generated by dividing the output voltage Vo with two resistors.

The DC-DC converters 10a, 10b, and 10d and the control circuits 11a and 11b of the DC-DC converter may be formed as a single chip semiconductor device or as a module such as a print substrate. Further, the DC-DC converters 10a, 10b, and 10d and the control circuits 11a and 11b may be used as a power supply device or be incorporated in an electronic device.

The present examples and embodiments are to be considered as illustrative and not restrictive, and the invention is not to be limited to the details given herein, but may be modified within the scope and equivalence of the appended claims.

What is claimed is:

1. A DC-DC converter performing pulse width modulation or pulse frequency modulation and outputting an output voltage via a choke coil, the DC-DC converter comprising:
    a first transistor receiving an input voltage;
    a second transistor coupled to the first transistor, the choke coil being coupled to a node between the first and second transistors;
    a drive control circuit, coupled to the first and second transistors, generating a first drive signal and a second drive signal activating and inactivating the first transistor and the second transistor in a complementary manner;
    a reversed flow detection circuit detecting current flowing to the second transistor and generating a detection signal controlling activation and inactivation of the second transistor; and
    a detection signal invalidation circuit, coupled to the reversed flow detection circuit and the drive control circuit, invalidating the detection signal in response to an operation switch signal during the pulse width modulation.

2. The DC-DC converter according to claim 1, wherein the second transistor and the reversed flow detection circuit function to configure an ideal diode during the pulse width modulation.

3. The DC-DC converter according to claim 1, wherein the reversed flow detection circuit stops operating during the pulse width modulation in response to the operation switch signal.

4. The DC-DC converter according to claim 3, wherein the reversed flow detection circuit includes:

a constant current source;
a current mirror;
a differential amplifier coupled to the current mirror; and
a coupling circuit coupling the constant current source to the current mirror, the coupling circuit uncoupling the constant current source and the current mirror during the pulse width modulation in response to the operation switch signal.

5. The DC-DC converter according to claim 1, wherein the reversed flow detection circuit operates in a normal operation mode or a low power consumption mode and executes the low power consumption mode during the pulse width modulation in response to the operation switch signal.

6. The DC-DC converter according to claim 5, wherein the reversed flow detection circuit includes:
a first constant current source;
a first current mirror coupled to the first constant current source;
a second constant current source;
a second current mirror;
a differential amplifier coupled to the first current mirror and the second current mirror; and
a coupling circuit coupling the second constant current source to the second current mirror, the coupling circuit uncoupling the second constant current source and the second current mirror during the pulse width modulation in response to the operation switch signal.

7. The DC-DC converter according to claim 1, wherein the DC-DC converter is operable in a continuous current mode or a discontinuous current mode, the drive control circuit constantly being operated in the continuous current mode when pulse width modulation is performed.

8. The DC-DC converter according to claim 1, wherein the drive control circuit activates and inactivates the first transistor to keep the output voltage constant when the operation switch signal has a first level during the pulse frequency modulation, and activates and inactivates the first transistor and the second transistor in a complementary manner to keep the output voltage constant when the operation switch signal has a second level during the pulse width modulation.

9. The DC-DC converter according to claim 1, wherein the drive control circuit includes:
an error amplification circuit comparing the output voltage or divided voltage of the output voltage with a reference voltage and generating an error signal;
a pulse signal generation circuit generating a pulse signal having a pulse width corresponding to the error signal;
a first driver circuit logically synthesizing the pulse signal and the second drive signal and generating the first drive signal;
a second driver circuit logically synthesizing the first drive signal and the detection signal and generating the second drive signal; and
a drive signal invalidation circuit, coupled between the first driver circuit and the second driver circuit, invalidating the first drive signal provided from the first driver circuit to the second driver circuit based on the operation switch signal, wherein:
the first driver circuit generates the first drive signal during the pulse width modulation based on the pulse signal and the second drive signal and generates the first drive signal during the pulse frequency modulation based on the pulse signal; and
the second driver circuit generates the second drive signal during the pulse width modulation based on the first drive signal and generates the second drive signal during the pulse frequency modulation based on the detection signal.

10. The DC-DC converter according to claim 9, wherein the drive control circuit further includes a tunneling prevention pulse generation circuit generating a tunneling prevention pulse inactivating the second transistor for a predetermined period from before the first transistor is activated until after the first transistor is activated.

11. The DC-DC converter according to claim 10, wherein:
the pulse signal generation circuit includes an oscillator generating a clock signal in a predetermined cycle; and
the tunneling prevention pulse generation circuit generates the tunneling prevention pulse in synchronization with the clock signal.

12. The DC-DC converter according to claim 1, wherein the detection signal invalidation circuit invalidates the detection signal in response to the operation switch signal during at least a certain period of the pulse width modulation.

13. A DC-DC converter performing pulse width modulation or pulse frequency modulation and outputting an output voltage via a choke coil, the DC-DC converter comprising:
a first transistor receiving an input voltage;
a second transistor coupled to the first transistor, the choke coil coupled to a node between the first and second transistors;
a drive control circuit, coupled to the first and second transistors, generating a first drive signal and a second drive signal activating and inactivating the first transistor and the second transistor in a complementary manner; and
a reversed flow detection circuit detecting current flowing to the second transistor and generating a detection signal controlling activation and inactivation of the second transistor, wherein the reversed flow detection circuit receives an operation switch signal for switching between a pulse width modulation mode and a pulse frequency modulation mode and stops operating when the operation switch signal indicates the pulse width modulation mode.

14. A control circuit for a DC-DC converter that performs pulse width modulation or pulse frequency modulation and outputs an output voltage via a choke coil, the DC-DC converter including a first transistor receiving an input voltage, and a second transistor coupled to the first transistor, the choke coil being coupled to a node between the first and second transistors; the control circuit comprising:
a drive control circuit, coupled to the first and second transistors, generating a first drive signal and a second drive signal activating and inactivating the first transistor and the second transistor in a complementary manner;
a reversed flow detection circuit detecting current flowing to the second transistor and generating a detection signal controlling activation and inactivation of the second transistor; and
a detection signal invalidation circuit, coupled to the reversed flow detection circuit and the drive control circuit, receiving an operation switch signal in response to the operation switch signal during the pulse width modulation mode.

15. The control circuit according to claim 14, wherein the reversed flow detection circuit operates in a normal operation mode or a low power consumption mode and executes the low power consumption mode during the pulse width modulation in response to the operation switch signal.

16. The control circuit according to claim 14, wherein the DC-DC converter is operable in a continuous current mode or a discontinuous current mode, and the drive control circuit constantly operates in the continuous current mode during the pulse width modulation.

17. The control circuit according to claim 14, wherein the operation switch signal is generated to have a first level during the pulse width modulation and a second level during the pulse frequency modulation.

18. The control circuit according to claim 14, wherein the drive control circuit activates and inactivates the first transistor to keep the output voltage constant when the operation switch signal has a first level during the pulse frequency modulation and activates and inactivates the first transistor and the second transistor to keep the output voltage constant when the operation switch signal has a second level during the pulse width modulation.

19. The control circuit according to claim 14, wherein the drive control circuit includes:
 an error amplification circuit comparing the output voltage or divided voltage of the output voltage with a reference voltage and generating an error signal;
 a pulse signal generation circuit generating a pulse signal having a pulse width corresponding to the error signal;
 a first driver circuit logically synthesizing the pulse signal and the second drive signal and generating the first drive signal;
 a second driver circuit logically synthesizing the first drive signal and the detection signal and generating the second drive signal; and
 a drive signal invalidation circuit, coupled between the first driver circuit and the second driver circuit, invalidating the first drive signal provided from the first driver circuit to the second driver circuit based on the operation switch signal, wherein:
 the first driver circuit generates the first drive signal during the pulse width modulation based on the pulse signal and the second drive signal and generates the first drive signal during the pulse frequency modulation based on the pulse signal; and
 the second driver circuit generates the second drive signal during the pulse width modulation based on the first drive signal and generates the second drive signal during the pulse frequency modulation based on the detection signal.

20. A control circuit for a DC-DC converter performing pulse width modulation or pulse frequency modulation and outputting an output voltage via a choke coil, the DC-DC converter including a first transistor receiving an input voltage, and a second transistor coupled to the first transistor, the choke coil being coupled to a node between the first and second transistors; the control circuit comprising:
 a drive control circuit, coupled to the first and second transistors, generating a first drive signal and a second drive signal activating and inactivating the first transistor and the second transistor in a complementary manner; and
 a reversed flow detection circuit detecting current flowing to the second transistor and generating a detection signal controlling activation and inactivation of the second transistor, wherein the reversed flow detection circuit receives an operation switch signal for switching between a pulse width modulation mode and a pulse frequency modulation mode and stops operation when the operation switch signal indicates the pulse width modulation mode.

21. The DC-DC converter according to claim 1, wherein the operation switch signal provides switching between a pulse width modulation mode and a pulse frequency modulation mode, and the detection signal invalidation circuit invalidates the detection signal when the operation switch signal indicates the pulse width modulation mode.

22. The control circuit according to claim 14, wherein the operation switch signal provides switching between a pulse width modulation mode and a pulse frequency modulation mode, and the detection signal invalidation circuit invalidates the detection signal when the operation switch signal indicates the pulse width modulation mode.

* * * * *